UNITED STATES PATENT OFFICE.

FRANCIS L. STEWART, OF MURRYSVILLE, PENNSYLVANIA, ASSIGNOR TO MAIZE SUGAR & CELLULOSE COMPANY, OF PITTSBURGH, PENNSYLVANIA, A CORPORATION OF SOUTH DAKOTA.

PROCESS OF PREPARING SUGAR-CANE AND MAIZE JUICES.

1,018,994.   Specification of Letters Patent.   Patented Feb. 27, 1912.

No Drawing.   Application filed May 6, 1909. Serial No. 494,408.

*To all whom it may concern:*

Be it known that I, FRANCIS L. STEWART, of Murrysville, Westmoreland county, Pennsylvania, have invented a new and useful Process of Preparing Sugar-Cane and Maize Juices, of which the following is a full, clear, and exact description.

My invention relates to the purifying and preparing of the saccharine juices of maize or sugar cane; and is designed to give greater purification than that heretofore accomplished, and also greatly improve and increase the crystallization of sugar therefrom.

Before describing my invention, I wish to call attention to the fact that it is applicable only to the treatment of saccharine juice contained in the stalk of the maize plant, when the plant has been subjected to a system of field treatment hereinafter mentioned, causing it to accumulate within it an abnormal quantity of sugar, and to the juice of the sugar cane when the cane is too immature to permit of the crystallization and separation of the sugar by the ordinary means. These juices when in this condition have characteristics and properties which are peculiar to themselves under those conditions, the one differing widely from maize juice in its best normal condition, and the other from cane juice when sufficiently mature and pure to produce from it commercial sugar by any processes commonly employed. This type of juices differs still more widely from the beet juice in the constituents other than sugar which they contain—as widely as the physical characteristics of the plants from which they are derived. As is well known, these non-sugar substances constitute the impurities which, in the art of sugar making, are necessarily to be separated from the sugar, or their deleterious influence neutralized, before perfect crystallization of the sugar can take place. It is also well known that the beet and the sugar cane differ so greatly from each other in the nature and qualities of the impurities as to require the use of entirely different methods of defecation and clarification. I find also that the juices of both these differ greatly from those of maize or the sugar cane when taken in the condition above described. The latter are entitled to rank in a class apart by themselves. It follows from this that the system of defecation, for the removal of the impurities in each, must differ as widely as they differ from each other in chemical constitution and physical qualities.

I have discovered and demonstrated the fact that the stalk of the maize plant under a special system of treatment, when in the growing condition, can be forced to accumulate a very largely increased store of true sugar as reserve matter within its cells, thus augmenting the sugar content to such an extent as to give it equal sugar productive capacity to the southern cane. This mode of treatment is the subject of Letters Patent of the United States, dated January 30, 1906, No. 811,523.

In my description of the process which follows this, I wish to note the fact as of primary importance in connection therewith, that the process itself is adapted only to the purification and elimination of the impurities from the juice of maize and of sugar cane when in the above mentioned condition.

I am well aware of the circumstances that the active chemical agents hereinafter specified as being employed in this process, have for half a century or more been specified in Letters Patent in the United States and foreign countries, and claimed for various purposes, under a great variety of conditions, for the clarification of saccharine juices. I disclaim entirely the use of chemical agents, as hereinafter mentioned, if used for the purposes set forth and specified in any former or existing processes that have come within my knowledge.

I claim as new and original with myself the discovery that sulfurous oxid, when used even in very large excess, following the use of an excess of lime or magnesia in the hot juice of maize and the sugar cane in the condition above mentioned, instead of inverting a large proportion of the sugar, as the accepted authorities on sugar chemistry assert it does in its action upon ordinary cane or beet juice, has in this case just the opposite effect of shielding and protecting the sugar from injury resulting from the presence of organic impurities of such a character as would either destroy the sugar or prevent its crystallization. It has become the common practice in cane growing countries to introduce sulfurous oxid in some form, and generally as a gas obtained from burning sulfur, for the alleged purpose of preventing fermentation and also as a decolorizer. This is then followed by the use of lime and heat. But in order to overcome the alleged deleterious effect of the acid upon the sugar when the solution is heated, care is taken to quickly saturate it with lime or an alkali, generally used in excess for the purpose of separating from the juice such impurities as lime or other alkaline agents will remove under those specific conditions. This action of the lime is imperfect, inasmuch as it destroys a portion of the sugar, and decomposes the glucose, causing an impediment to the crystallization of another portion. I have ascertained that when the juice of maize or imperfectly matured sugar cane is subjected to the treatment hereinafter prescribed, this peculiar protective power of the sulfurous oxid is exercised and made manifest and the rapid crystallization and separation of the sugar uniformly follows, when by the common processes, or any other processes known to me, its crystallization is impossible. As an example of this I would cite the case of the production of high grade sugar from the juice of the immature southern cane, from which only syrup is now capable of being produced by the ordinary means.

I claim as new and valuable a process of purifying the juices of maize and of imperfectly matured sugar cane, and of promoting and producing the crystallization of their sugar, which is briefly described as follows: The sugar juice is first heated to a temperature of about 180° Fahrenheit, and then treated with magnesia or lime hydrate, or preferably with the magnesia and lime combined in about equal proportions by weight, until the liquid shows decided alkalinity to test paper. The liquid is then brought to the boiling temperatures, the heat then shut off, the precipitate in the form of scum curd sediment separated, the liquid then speedily racked off into another tank, and sulfurous oxid in the form of gas, or its solution in water (sulfurous acid) or as produced from any of the sulfites, added until the liquid shows a strong acid reaction to litmus or phenol phthalein paper. As an alternative, the magnesia-lime compound may be added to the cold juice to alkalinity, the sulfurous oxid then blown into it from a generator of the gas until it shows a decidedly acid reaction to test paper, the juice then brought to the boil and the scum and sediment removed. This aciduous condition must be maintained in the liquid during the early stages of evaporation. After the treatment with the sulfurous oxid, the juice must be filtered and then evaporated in vacuum apparatus by the usual methods.

I claim:

1. The method of treating and purifying the juice of immature maize or immature sugar cane, consisting in treating the juice with an alkaline reagent until it gives an alkaline reaction, and then treating the juice with sulfurous oxid (dioxid of sulfur), until it shows an aciduous condition; substantially as described.

2. The method of treating the juice of immature maize or immature sugar cane, consisting in adding an alkaline reagent such as magnesia or lime, until the juice shows an alkaline reaction, then removing some of the impurities, then treating the liquid with sulfurous oxid until the juice shows an acid reaction, then heating the juice, filtering and evaporating the juice; substantially as described.

3. The method of treating the juice of immature maize and immature sugar cane, preparatory to evaporation, consisting in treating the juice with an alkaline reagent until it shows an alkaline reaction, then treating the juice with sulfurous oxid until it shows a strong acid reaction, heating the juice to the boiling point, removing the scum and filtering the juice; substantially as described.

4. The method of treating the juice of immature maize and immature sugar cane, preparatory to evaporation, consisting in treating the juice with an alkaline reagent until it shows an alkaline reaction, then treating the juice with sulfurous oxid until it shows a strong acid reaction, heating the juice to the boiling point, removing the scum and sediment, filtering and evaporating the juice while maintaining an aciduous condition during the early stage of evaporation; substantially as described.

In testimony whereof, I have hereunto set my hand.

FRANCIS L. STEWART.

Witnesses:
G. M. VIERS,
H. M. CORWIN.